(12) United States Patent
Okura

(10) Patent No.: US 10,286,479 B2
(45) Date of Patent: May 14, 2019

(54) ASSEMBLED BATTERY, EXTERIOR TUBE EQUIPPED BATTERY, AND MANUFACTURING METHOD OF ASSEMBLED BATTERY WELDED TO BUS BAR

(71) Applicant: TOYOTA JIDOSHA KABUSHIKI KAISHA, Toyota-shi, Aichi-ken (JP)

(72) Inventor: Toshinori Okura, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 772 days.

(21) Appl. No.: 14/951,931

(22) Filed: Nov. 25, 2015

(65) Prior Publication Data
US 2016/0149169 A1 May 26, 2016

(30) Foreign Application Priority Data
Nov. 26, 2014 (JP) ................. 2014-238795

(51) Int. Cl.
| | |
|---|---|
| B23K 11/34 | (2006.01) |
| H01M 2/10 | (2006.01) |
| B23K 11/11 | (2006.01) |
| B23K 11/30 | (2006.01) |
| H01M 2/20 | (2006.01) |
| B23K 101/38 | (2006.01) |

(52) U.S. Cl.
CPC ............ *B23K 11/34* (2013.01); *B23K 11/11* (2013.01); *B23K 11/3009* (2013.01); *H01M 2/105* (2013.01); *H01M 2/1077* (2013.01); *B23K 2101/38* (2018.08); *H01M 2/202* (2013.01)

(58) Field of Classification Search
None
See application file for complete search history.

(56) References Cited

U.S. PATENT DOCUMENTS
| | | | |
|---|---|---|---|
| 6,410,185 B1 | 6/2002 | Takahashi et al. | |
| 2013/0270749 A1 | 10/2013 | Hachtmann et al. | |

FOREIGN PATENT DOCUMENTS
| | | |
|---|---|---|
| JP | 2-195645 A | 8/1990 |
| JP | 2000-306563 A | 11/2000 |
| JP | 2004-335452 A | 11/2004 |
| JP | 2009-211908 A | 9/2009 |
| JP | 2013-8655 A | 1/2013 |
| JP | 2013-243123 A | 12/2013 |

*Primary Examiner* — Sarah A. Slifka
(74) *Attorney, Agent, or Firm* — Sughrue Mion, PLLC

(57) ABSTRACT

An assembled battery includes: a holder having a holding hole; and an exterior tube equipped battery, wherein: the holder accommodates the exterior tube equipped battery into the holding hole; the exterior tube includes a cylindrical outer-peripheral-surface adhesion portion and a toric peripheral edge covering portion that covers a surface peripheral edge portion; and
the assembled battery includes a first adhesive injected and solidified in a gap between an outer peripheral surface of that part of the exterior tube equipped battery which is placed inside the holding hole and that inner peripheral surface of the holder which constitutes a hole wall of the holding hole, and a second adhesive injected and solidified in a gap between the surface peripheral edge portion of the battery and the peripheral edge covering portion.

4 Claims, 13 Drawing Sheets

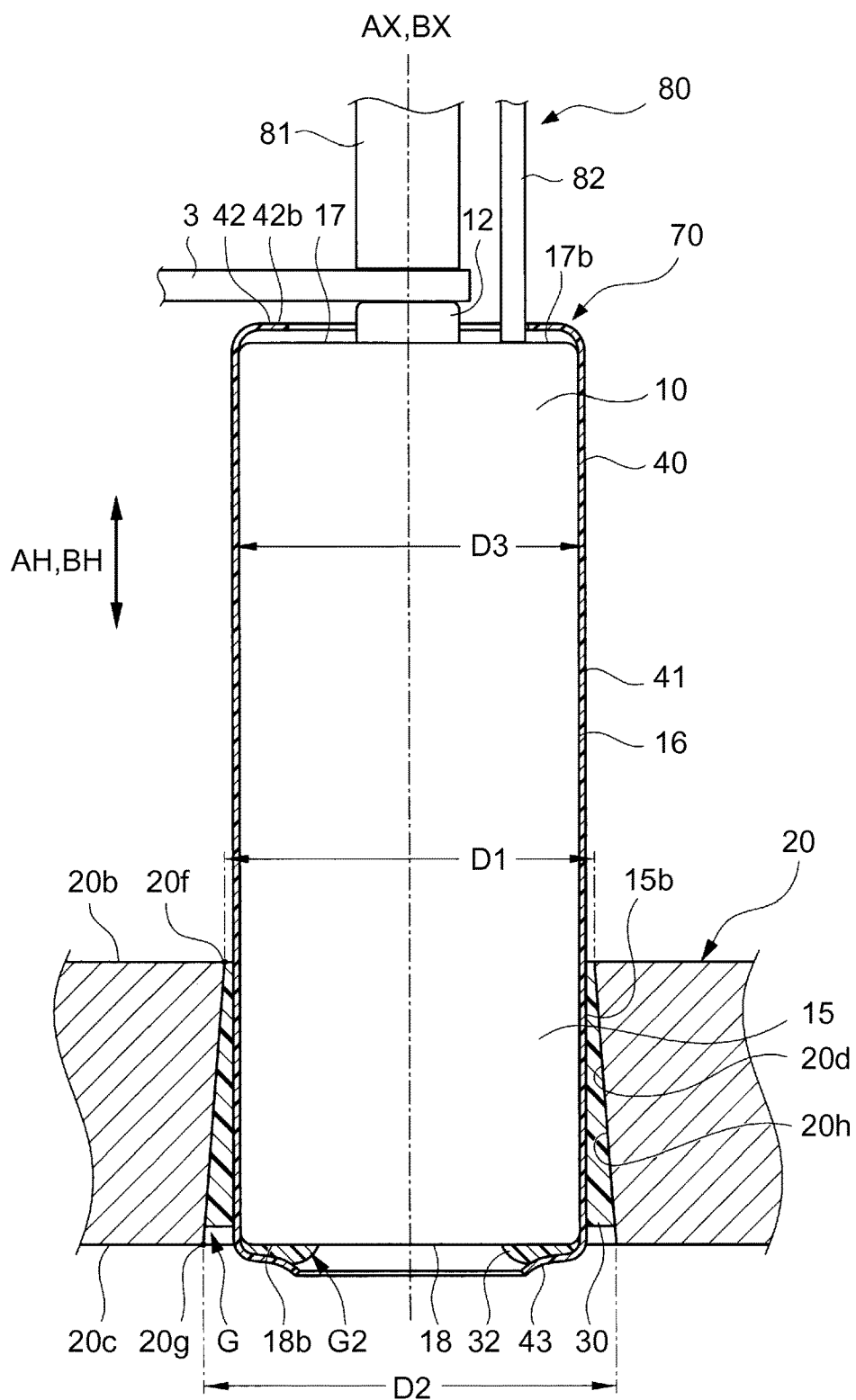

ASSEMBLED BATTERY, EXTERIOR TUBE EQUIPPED BATTERY, AND MANUFACTURING METHOD OF ASSEMBLED BATTERY WELDED TO BUS BAR

INCORPORATION BY REFERENCE

The disclosure of Japanese Patent Application No. 2014-238795 filed on Nov. 26, 2014 including the specification, drawings and abstract is incorporated herein by reference in its entirety.

BACKGROUND OF THE INVENTION

1. Field of the Invention

The present invention relates to an assembled battery, an exterior tube equipped battery to be used therein, and a manufacturing method of an assembled battery welded to a bus bar.

2. Description of Related Art

Japanese Patent Application Publication No. 2009-211908 (JP 2009-211908 A) describes an assembled battery including: a plurality of exterior tube equipped batteries each including a cylindrical battery and an exterior tube covering an outer peripheral surface of the battery; and a tray having a plurality of cylindrical partition wall members. In the assembled battery, the exterior tube equipped battery is inserted inside the cylindrical partition wall member so as to be accommodated in the tray. As the exterior tube equipped battery, such a battery is disclosed that: a cylindrical exterior tube made of thermally shrinkable resin is placed so as to cover an outer periphery of a cylindrical battery, and in this state, the exterior tube is heated so as to thermally shrink, so that the battery has a cylindrical exterior tube tightly adhered to an outer peripheral surface of the battery.

Further, in recent years, such an assembled battery has been proposed which includes: a holder having a front surface and a back surface and having a plurality of holding holes, which are cylindrical holes penetrating through between the front surface and the back surface; and cylindrical exterior tube equipped batteries inserted into the holding holes. In the assembled battery, in order to fix the exterior tube equipped battery into the holding hole of the holder, an outer peripheral surface (an outer peripheral surface of an exterior tube) of that part of the exterior tube equipped battery which is placed inside the holding hole is joined, by an adhesive, to that inner peripheral surface of the holder which constitutes the holding hole, for example.

In the meantime, in the above assembled battery, in order to electrically connect electrode terminals of adjacent batteries that constitute the assembled battery, for example, a bus bar is welded by resistance welding to an electrode terminal provided on a first surface placed on one end side of the cylindrical battery in an axis direction or on a second surface placed on the other end side thereof. More specifically, in a state where the bus bar is placed on the electrode terminal, a large load is applied to the bus bar in the axis direction of the battery by a welding electrode of a resistance welder, so as to weld the electrode terminal with pressure to the bus bar.

SUMMARY OF THE INVENTION

However, when a large load is applied to the bus bar in the axis direction of the battery by the welding electrode of the resistance welder in a state where the bus bar is placed on the electrode terminal, only the battery in the exterior tube equipped battery may move to the axis direction (a load direction) (the battery may be displaced relative to the exterior tube in the axis direction). This is because the exterior tube is firmly joined to the holder by an adhesive, but the battery is just held by the exterior tube due to adhesion of the exterior tube (the battery is not directly joined to the holder). More specifically, the battery that is going to move in the axis direction due to a load received from the welding electrode cannot be held by the adhesion of the exterior tube with respect to the outer peripheral surface of the battery. This may cause such a problem that the bus bar cannot be welded to the electrode terminal, appropriately.

The present invention provides an assembled battery in which an exterior tube of an exterior tube equipped battery is firmly fixed to a holder and the battery is firmly fixed to the exterior tube, an exterior tube equipped battery to be used in the assembled battery, and a manufacturing method of an assembled battery welded to a bus bar.

An assembled battery according to a first aspect of the present invention includes: a holder including a front surface, a back surface, and a holding hole, the holding hole being a cylindrical hole penetrating through between the front surface and the back surface; and an exterior tube equipped battery including a cylindrical battery extending in an axis direction and including a first surface placed on one end side in terms of the axis direction, a second surface placed on the other end side in terms of the axis direction, and an outer peripheral surface placed between the first surface and the second surface, and a cylindrical exterior tube including an electrical insulation property and covering the outer peripheral surface of the battery, wherein: the exterior tube equipped battery has an outside diameter smaller than an inside diameter of the holding hole; the holder accommodates the exterior tube equipped battery into the holding hole; the exterior tube includes a cylindrical outer-peripheral-surface adhesion portion tightly adhered to the outer peripheral surface of the battery, and a toric peripheral edge covering portion that covers a surface peripheral edge portion, which is an outer peripheral edge portion of at least either one of the first surface and the second surface of the battery; and the assembled battery includes a first adhesive injected and solidified in a gap between an outer peripheral surface of that part of the exterior tube equipped battery which is placed inside the holding hole and that inner peripheral surface of the holder which constitutes a hole wall of the holding hole, and a second adhesive injected and solidified in a gap between the surface peripheral edge portion of the battery and the peripheral edge covering portion.

The above assembled battery includes the holder having a plurality of cylindrical holding holes, and cylindrical exterior tube equipped batteries each configured such that at least part thereof is accommodated in the holding hole (inserted into the holding hole). Further, the above assembled battery includes the first adhesive injected and solidified in a gap between the outer peripheral surface of that part of the exterior tube equipped battery which is placed inside the holding hole of the holder (that is, an outer peripheral surface of the outer-peripheral-surface adhesion portion of the exterior tube), and that inner peripheral surface of the holder which constitutes the holding hole. Hereby, the exterior tube of the exterior tube equipped battery is firmly fixed to the holder in a state where the exterior tube of the exterior tube equipped battery is joined, via the first adhesive, to the inner peripheral surface of the holder which constitutes the holding hole.

Further, in the above assembled battery, the exterior tube includes the cylindrical outer-peripheral-surface adhesion portion tightly adhered to the outer peripheral surface of the battery, and the toric peripheral edge covering portion that covers the surface peripheral edge portion, which is an outer peripheral edge portion of at least either one of the first surface and the second surface of the battery. The peripheral edge covering portion covers the surface peripheral edge portion with a gap being provided between the peripheral edge covering portion and the surface peripheral edge portion.

Further, the above assembled battery includes the second adhesive injected and solidified in the gap between the surface peripheral edge portion (a part covered with the peripheral edge covering portion of the exterior tube) of the battery and the peripheral edge covering portion. Hereby, the battery is joined to the exterior tube by the second adhesive, so that the battery is firmly fixed to the exterior tube.

Accordingly, in a case where the bus bar is welded by resistance welding to an electrode terminal provided on the first surface or the second surface of the battery as described above, for example, even if a large load is applied to the bus bar in the axis direction of the battery by a welding electrode in a state where the bus bar is placed on the electrode terminal, it is possible to prevent only the battery in the exterior tube equipped battery from moving to the axis direction (a load direction) (it is possible to prevent the battery from being displaced relative to the exterior tube in the axis direction).

Note that the "battery" may be, for example, a single cell having one electrode body in a cylindrical battery outer case, or a battery having a plurality of electrode bodies in a cylindrical battery outer case. Further, the first adhesive and the second adhesive may be equivalent adhesives, or may be different adhesives. Further, the "cylindrical shape" of the holding hole may be not only a "linear cylindrical shape" in which the inner peripheral surface constituting the holding hole extends straight in the axis direction, but may also be a "diagonal cylindrical shape" in which the inner peripheral surface constituting the holding hole is a tapered surface (a surface extending in a diagonal direction in which the inner peripheral surface forms an angle relative to the axis).

Further, the above assembled battery may be an assembled battery in which the peripheral edge covering portion has an open end portion of the exterior tube as an open end portion of the peripheral edge covering portion; and the open end portion of the peripheral edge covering portion is configured to be distanced from the surface peripheral edge portion of the battery in the axis direction as it goes inward in a radial direction.

In the above assembled battery, the peripheral edge covering portion of the exterior tube has the open end portion of the exterior tube as the open end portion of the peripheral edge covering portion. Further, the open end portion of the peripheral edge covering portion is configured to be distanced from the surface peripheral edge portion of the battery in the axis direction (an axis-direction distance with respect the surface peripheral edge portion increases) as it goes inward in the radial direction. Hereby, it is possible to achieve a large axis-direction distance between the surface peripheral edge portion of the battery and a tip (an open end of the peripheral edge covering portion) of the open end portion of the peripheral edge covering portion (an opening dimension can be made large), thereby making it possible to easily inject the adhesive into the gap between the surface peripheral edge portion of the battery and the peripheral edge covering portion of the exterior tube (the adhesive easily flows into the gap). This accordingly makes it possible to appropriately inject the adhesive into the toric gap over a whole circumference thereof between the surface peripheral edge portion of the battery and the peripheral edge covering portion of the exterior tube, and to firmly fix the battery to the exterior tube.

An exterior tube equipped battery of a second aspect of the present invention includes: a cylindrical battery extending in an axis direction and including a first surface placed on one end side in terms of the axis direction, a second surface placed on the other end side in terms of the axis direction, and an outer peripheral surface placed between the first surface and the second surface; and a cylindrical exterior tube including an electrical insulation property and covering the outer peripheral surface of the battery, wherein:

the exterior tube includes a cylindrical outer-peripheral-surface adhesion portion tightly adhered to the outer peripheral surface of the battery, and a toric peripheral edge covering portion that covers a surface peripheral edge portion, which is an outer peripheral edge portion of at least either one of the first surface and the second surface of the battery; and the peripheral edge covering portion has a gap between the surface peripheral edge portion and the peripheral edge covering portion.

In the exterior tube equipped battery, the exterior tube includes the cylindrical outer-peripheral-surface adhesion portion tightly adhered to the outer peripheral surface of the battery, and the toric peripheral edge covering portion that covers the surface peripheral edge portion, which is an outer peripheral edge portion of at least either one of the first surface and the second surface of the battery. The peripheral edge covering portion covers the surface peripheral edge portion with a gap being provided between the peripheral edge covering portion and the surface peripheral edge portion. This makes it possible to inject the adhesive into the gap between the surface peripheral edge portion (a part covered with the peripheral edge covering portion of the exterior tube) of the battery and the peripheral edge covering portion.

Accordingly, by injecting the adhesive into the gap between the surface peripheral edge portion (a part covered with the peripheral edge covering portion of the exterior tube) of the battery and the peripheral edge covering portion, the battery is joined to the exterior tube by the adhesive, so that the battery can be firmly fixed to the exterior tube.

Further, by injecting the adhesive into the gap between an outer peripheral surface of a part of the exterior tube equipped battery inserted into the holding hole of the holder (at least partially accommodated in the holding hole of the holder) which part is placed inside the holding hole of the holder (that is, an outer peripheral surface of the outer-peripheral-surface adhesion portion of the exterior tube), and that inner peripheral surface of the holder which constitutes the holding hole, the exterior tube of the exterior tube equipped battery can be firmly fixed to the holder in a state where the exterior tube of the exterior tube equipped battery is joined, via the adhesive, to that inner peripheral surface of the holder which constitutes the holding hole.

Accordingly, by use of the above exterior tube equipped battery, it is possible to appropriately manufacture an assembled battery in which an exterior tube of an exterior tube equipped battery is firmly fixed to a holder and a battery is firmly fixed to the exterior tube.

Further, the above exterior tube equipped battery may be an exterior tube equipped battery in which the peripheral edge covering portion has an open end portion of the exterior tube as an open end portion of the peripheral edge covering portion; and the open end portion of the peripheral edge covering portion is configured to be distanced from the surface peripheral edge portion of the battery in the axis direction as it goes inward in a radial direction.

In the above exterior tube equipped battery, the peripheral edge covering portion of the exterior tube has the open end portion of the exterior tube as the open end portion of the peripheral edge covering portion. Further, the open end portion of the peripheral edge covering portion is configured to be distanced from the surface peripheral edge portion of the battery in the axis direction (an axis-direction distance with respect the surface peripheral edge portion increases) as it goes inward in the radial direction. Hereby, it is possible to achieve a large axis-direction distance between the surface peripheral edge portion of the battery and a tip (an open end of the peripheral edge covering portion) of the open end portion of the peripheral edge covering portion (an opening dimension can be made large), thereby making it possible to easily inject the adhesive into the gap between the surface peripheral edge portion of the battery and the peripheral edge covering portion of the exterior tube (the adhesive easily flows into the gap). This accordingly makes it possible to appropriately inject the adhesive into the toric gap over a whole circumference thereof between the surface peripheral edge portion of the battery and the peripheral edge covering portion of the exterior tube, and to firmly fix the battery to the exterior tube.

A manufacturing method of an assembled battery welded to a bus bar, according to a third aspect of the present invention, includes: accommodating an exterior tube equipped battery into a holding hole of a holder, the exterior tube equipped battery including: a cylindrical battery extending in an axis direction and including a first surface placed on one end side in terms of the axis direction, a second surface placed on the other end side in terms of the axis direction, and an outer peripheral surface placed between the first surface and the second surface, and a cylindrical exterior tube including an electrical insulation property and covering the outer peripheral surface of the battery, the exterior tube including a cylindrical outer-peripheral-surface adhesion portion tightly adhered to the outer peripheral surface of the battery, and a toric peripheral edge covering portion that covers a surface peripheral edge portion, which is an outer peripheral edge portion of at least either one of the first surface and the second surface of the battery, and the holder including a front surface, a back surface, and the holding hole, the holding hole being a cylindrical hole penetrating through between the front surface and the back surface and which has an inside diameter larger than an outside diameter of the exterior tube equipped battery; injecting and solidifying a first adhesive in a gap between an outer peripheral surface of that part of the exterior tube equipped battery which is placed inside the holding hole and that inner peripheral surface of the holder which constitutes a hole wall of the holding hole; injecting and solidifying a second adhesive in a gap between the surface peripheral edge portion of the battery and the peripheral edge covering portion; and applying a load to a bus bar in the axis direction by a welding electrode of a resistance welder in a state where the bus bar is placed on an electrode terminal provided on the first surface or the second surface.

According to the above manufacturing method, even if a large load is applied to the bus bar in the axis direction of the battery by the welding electrode of the resistance welder, the battery in the exterior tube equipped battery is not displaced alone in the axis direction. This accordingly makes it possible to weld the bus bar to the electrode terminal, appropriately.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is a view to describe a method of welding a bus bar.

DETAILED DESCRIPTION OF EMBODIMENTS

Figure 1:
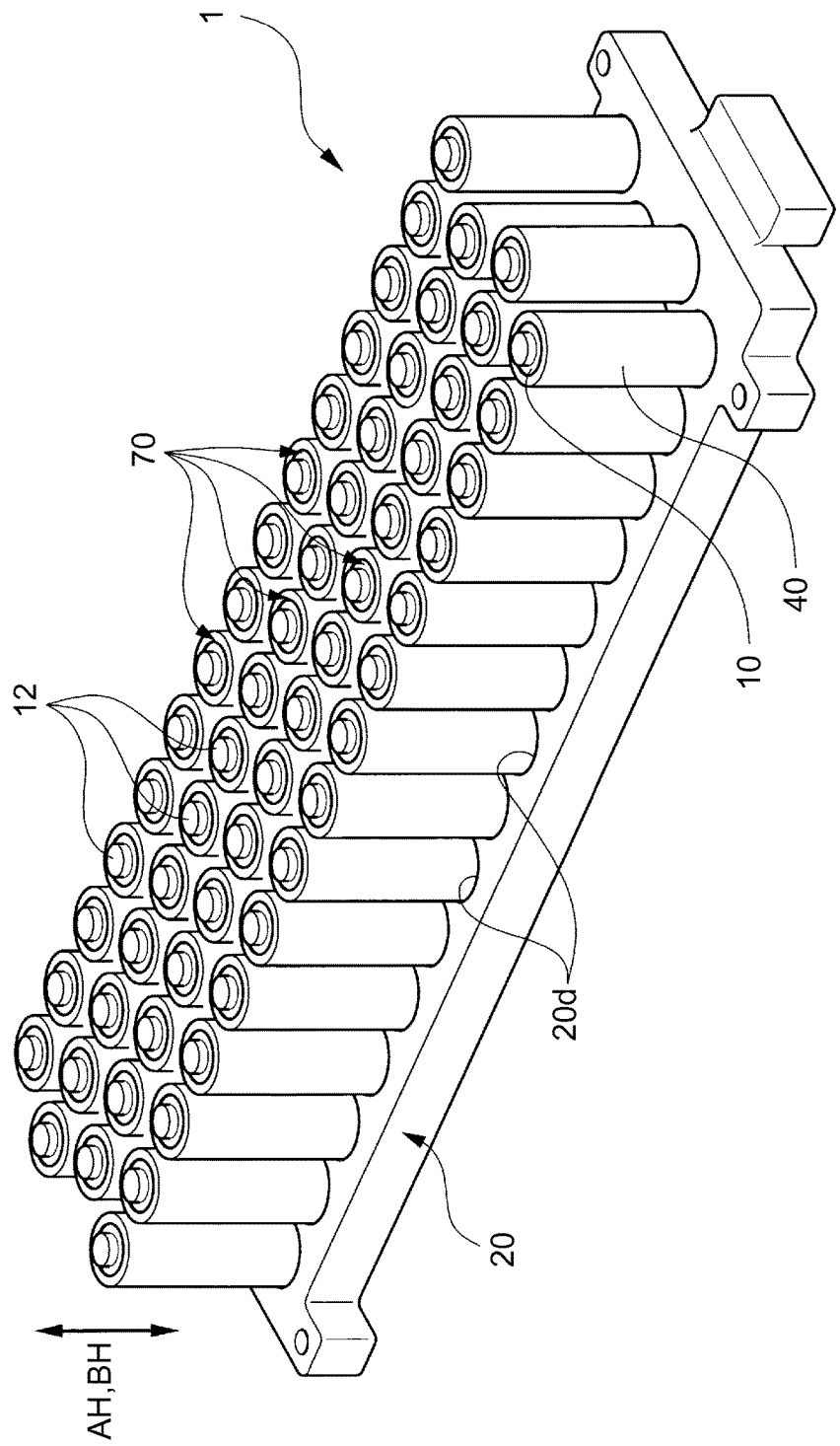
FIG. 1 is a perspective view of an assembled battery according to an embodiment.
Figure 2:
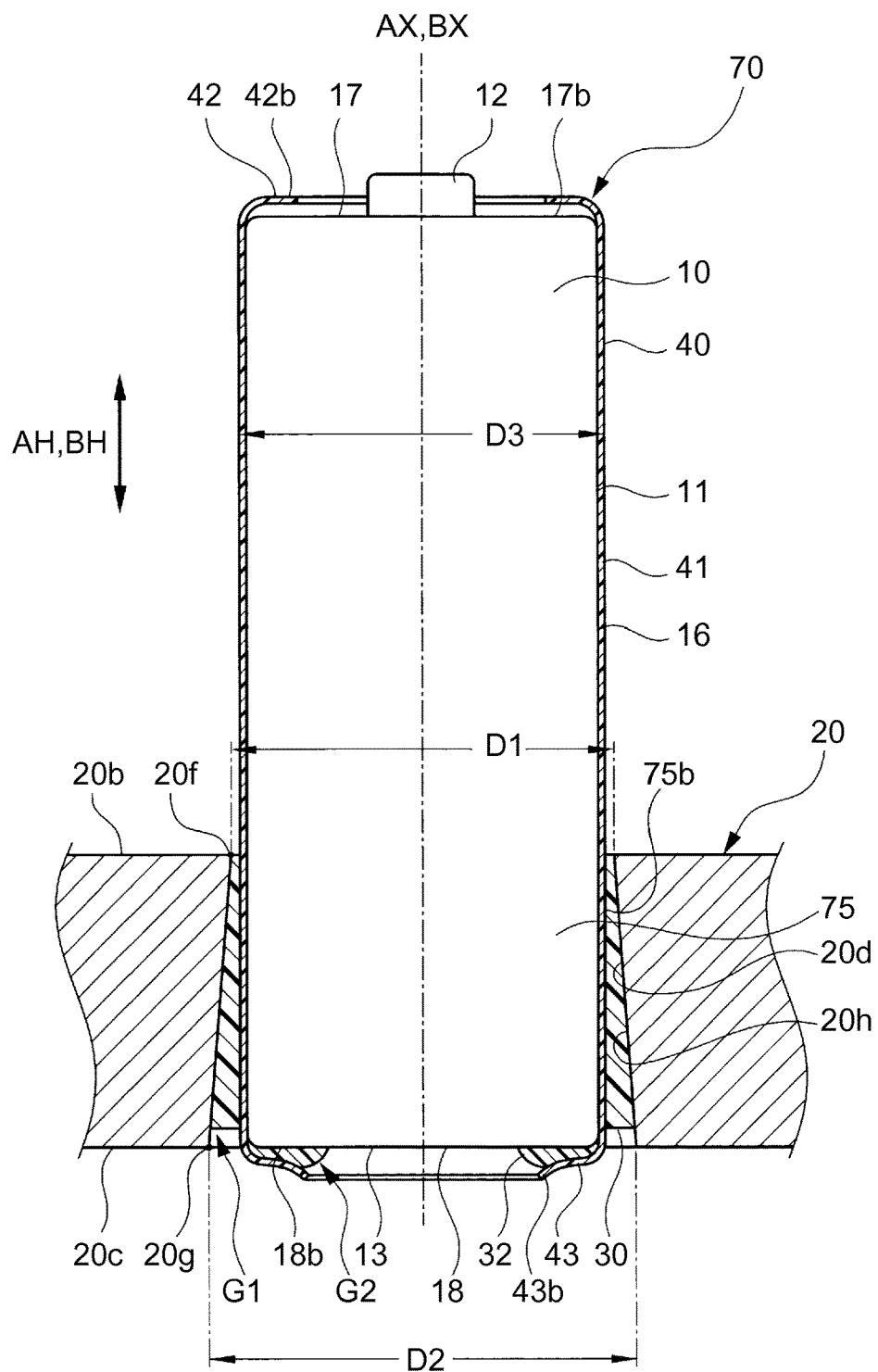
FIG. 2 is an enlarged partial sectional view of the assembled battery.

Next will be described an embodiment of the present invention with reference to the drawings. FIG. 1 is a perspective view of an assembled battery 1 according to an embodiment. FIG. 2 is an enlarged partial sectional view of the assembled battery 1 and an exterior tube equipped battery 70. As illustrated in FIG. 1, the assembled battery 1 of the embodiment includes a holder 20 and a plurality of exterior tube equipped batteries 70 fixed to the holder 20. Among them, the exterior tube equipped battery 70 includes a cylindrical battery 10 extending in an axis direction AH (a direction along an axis AX of the battery 10), and an exterior tube 40 covering an outer peripheral surface 16 of the battery 10 (see FIGS. 2 and 7).

The battery 10 is a cylindrical (pillar-shaped) lithium-ion secondary battery (more specifically, a 18650-type lithium-ion secondary battery). The battery 10 is a single cell, and includes: a cylindrical battery outer case 11; and an electrode body (not shown) and a nonaqueous electrolyte (not shown) accommodated inside the battery outer case 11. The electrode body is a wound electrode body formed such that a belt-shaped separator (not shown) is provided between a belt-shaped positive plate (not shown) and a belt-shaped negative plate (not shown), and then wound in a cylindrical manner.

Further, the battery 10 has a first surface 17 placed on one end side (an upper end side in FIGS. 2 and 7) in the axis direction AH, a second surface 18 placed on the other end side (a lower end side in FIGS. 2 and 7) in the axis direction AH, and an outer peripheral surface 16 placed between the first surface 17 and the second surface 18. Note that a projecting positive terminal 12 electrically connected to a positive plate of the electrode body inside the battery is provided on the first surface 17 (a top face in FIGS. 2 and 7) of the battery 10. Further, a negative terminal 13 electrically connected to a negative plate of the electrode body inside the battery is provided on the second surface 18 (a lower face in FIGS. 2 and 7) of the battery 10.

Figure 7:
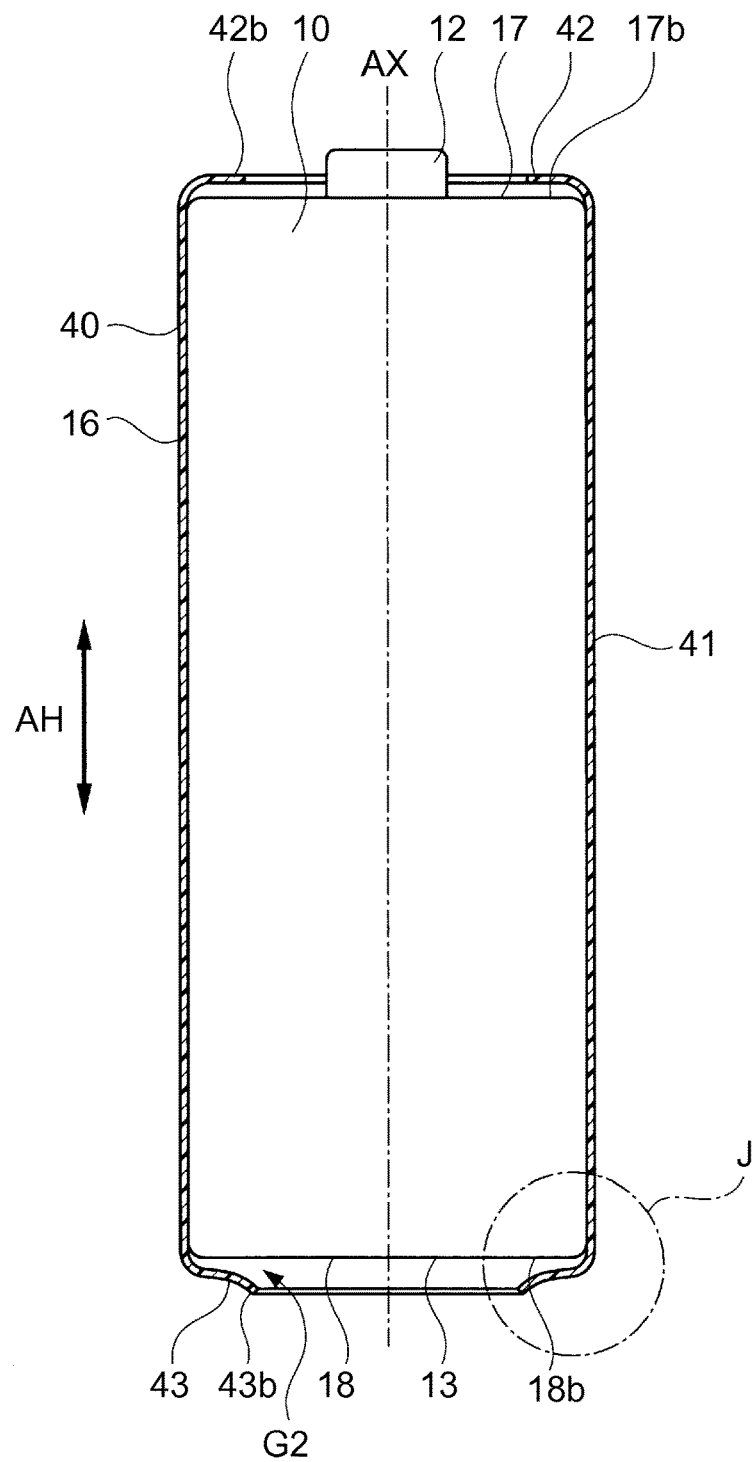
FIG. 7 is a partial sectional view of an exterior tube equipped battery.

The exterior tube 40 is made of resin having an electrical insulation property and a thermally shrinkable property, and has a cylindrical shape. As illustrated in FIGS. 2 and 7, the exterior tube 40 includes: a cylindrical outer-peripheral-surface adhesion portion 41 tightly adhered to the outer peripheral surface 16 of the battery 10; a toric first peripheral edge covering portion 42 covering a first-surface peripheral edge portion 17b, which is an outer peripheral edge of the first surface 17 of the battery 10; and a toric second peripheral edge covering portion 43 covering a second-surface peripheral edge portion 18b, which is an outer peripheral edge of the second surface 18 of the battery 10. Among them, the second peripheral edge covering portion 43 is placed so as to be distanced from the second-surface peripheral edge portion 18b without making contact with the second-surface peripheral edge portion 18b of the battery 10, and covers the second-surface peripheral edge portion 18b with a gap G2 being provided between the second peripheral edge covering portion 43 and the second-surface peripheral edge portion 18b (see FIGS. 7 and 8).

Figure 8:
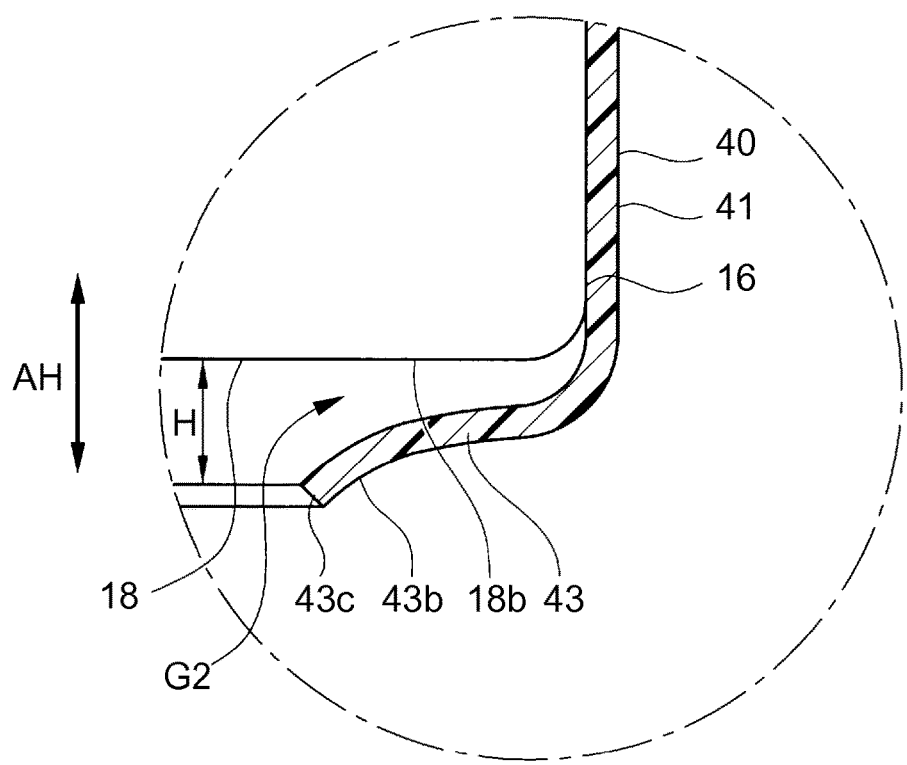
FIG. 8 is an enlarged view of a part J in FIG. 7.

Note that the first peripheral edge covering portion 42 has an open end portion on one end side (an upper end side in FIGS. 2 and 7) of the exterior tube 40 as its own open end portion 42b. Further, the second peripheral edge covering portion 43 has an open end portion on the other end side (a lower end side in FIGS. 2 and 7) of the exterior tube 40 as its own open end portion 43b. Here, as illustrated in FIG. 8, the open end portion 43b of the second peripheral edge covering portion 43 has such a configuration that the open end portion 43b is distanced from the second-surface peripheral edge portion 18b of the battery 10 in the axis direction AH (downward in FIG. 8) as it goes inward in a radial direction (an axis AX side of the battery 10, or a left side in FIG. 8).

Figure 3:
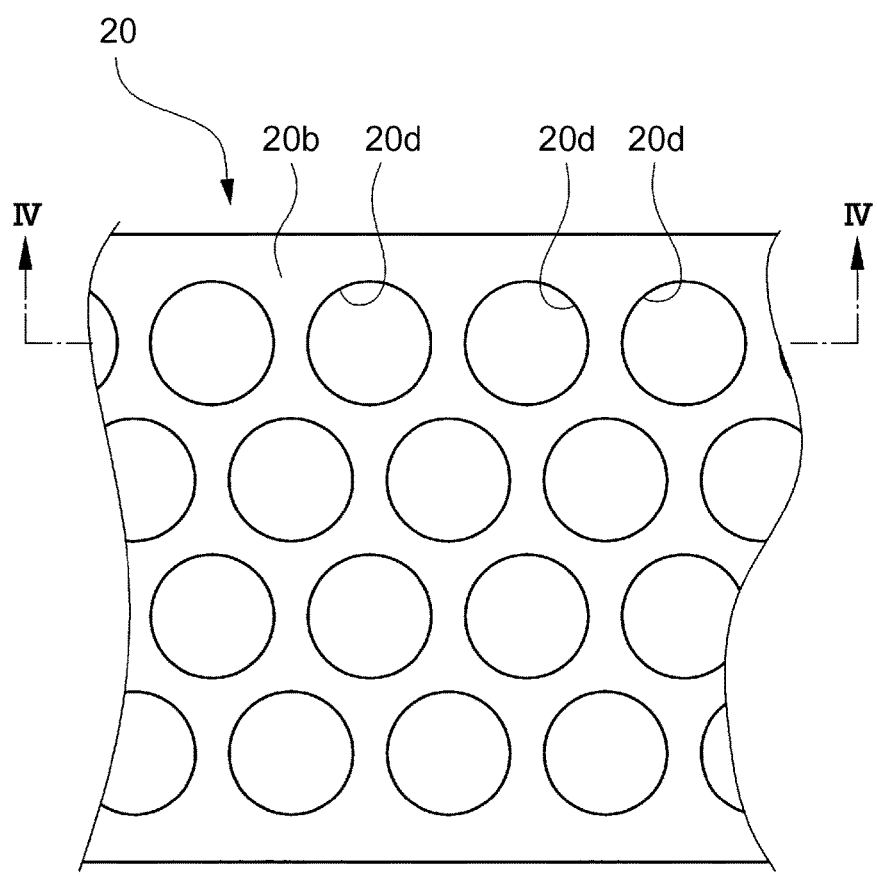
FIG. 3 is a plan view of a holder.
Figure 4:
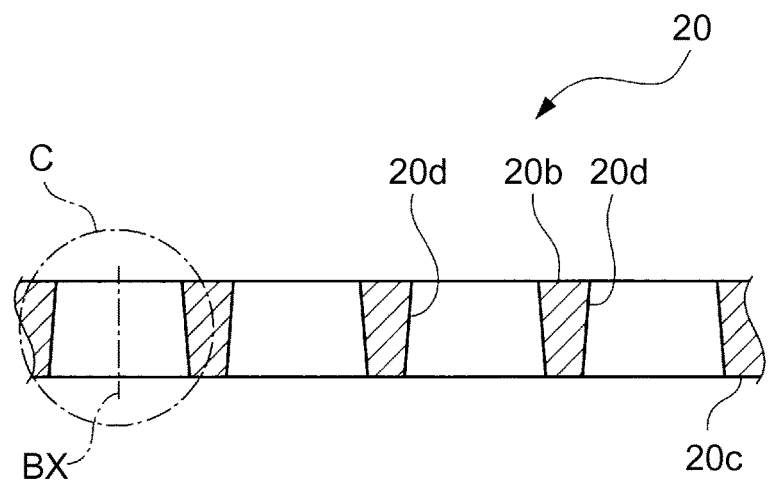
FIG. 4 is a sectional view taken along a line IV-IV in FIG. 3.

The holder 20 is made of a single metal member (more specifically, aluminum) having a plate shape (see FIG. 1), and has a front surface 20b and a back surface 20c. As illustrated in FIG. 3, a plurality of cylindrical (more specifically, oblique cylindrical) holding holes 20d, which are holes penetrating through between the front surface 20b and the back surface 20c, is formed in the holder 20 (see FIGS. 3 and 4). These holding holes 20d are arranged in a hound's tooth check, in a plan view of the holder 20.

Note that, in the present embodiment, as illustrated in FIG. 2, an outside diameter D3 of the exterior tube equipped battery 70 is made smaller than a minimum inside diameter (more specifically, an inside diameter D1 of a front-surface-side open end 20f, which is an open end of the holding hole 20d on a front-surface-20b side) of the holding hole 20d. This allows the exterior tube equipped battery 70 to be inserted into the holding hole 20d. In other words, the holder 20 is configured such that at least part of the exterior tube equipped battery 70 can be accommodated in the holding hole 20d. More specifically, part of the exterior tube equipped battery 70 (that part of the battery 10 which is on a second-surface-18 side) is inserted into the holding hole 20d. In other words, the holder 20 is configured such that the exterior tube equipped battery 70 is partially accommodated in the holding hole 20d.

Further, as illustrated in FIG. 2, the assembled battery 1 of the present embodiment includes a first adhesive 30 injected and solidified in a gap G1 between an outer peripheral surface 75b of that part (referred to as a held portion 75) of the exterior tube equipped battery 70 which is placed inside the holding hole 20d (that is, an outer peripheral surface of the outer-peripheral-surface adhesion portion 41 of the exterior tube 40), and that inner peripheral surface 20h of the holder 20 which constitutes the holding hole 20d. Hereby, the exterior tube 40 of each of the exterior tube equipped batteries 70 is firmly fixed to the holder 20 in a state where the exterior tube 40 is joined, via the first adhesive 30, to the inner peripheral surface 20h that constitutes the holding hole 20d.

Figure 5:
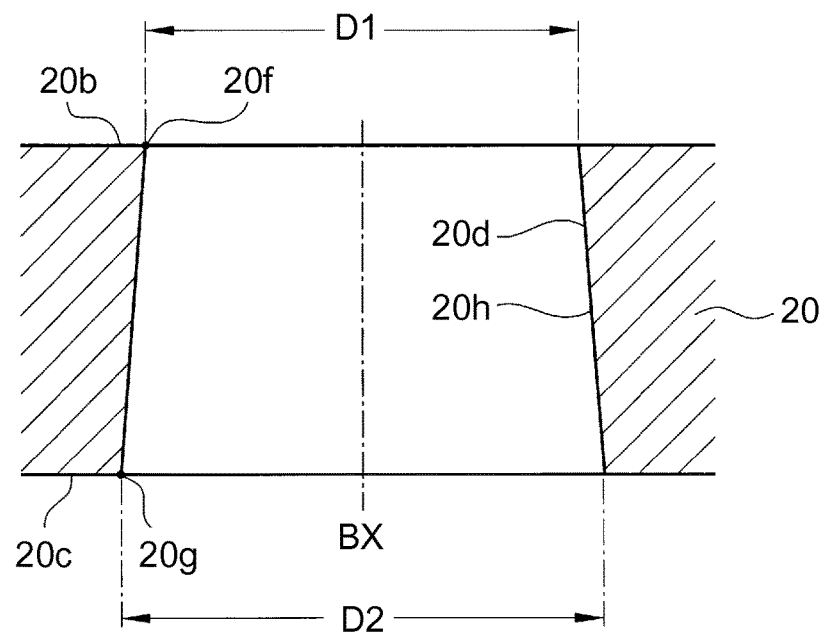
FIG. 5 is an enlarged view of a part C in FIG. 4.

Note that, in the assembled battery 1 of the present embodiment, the inside diameter D1 of the circular front-surface-side open end 20f, which is an open end of the holding hole 20d on the front-surface-20b side, is made smaller than an inside diameter D2 of a circular back-surface-side open end 20g, which is an open end of the holding hole 20d on a back-surface-20c side (see FIGS. 2, 5). As such, since the inside diameter D2 (a diameter) of the back-surface-side open end 20g is made larger than the inside diameter D1 (a diameter) of the front-surface-side open end 20f, the first adhesive 30 easily comes inside the gap G1 at the time when the first adhesive 30 is injected into the gap G1 from the back-surface-20c side (see FIG. 10) in a state where the back surface 20c of holder 20 is directed upward (the front surface 20b is directed downward), as will be described later. Further, since the inside diameter D1 of the front-surface-side open end 20f is smaller than the inside diameter D2 of the back-surface-side open end 20g, the first adhesive 30 thus injected from the back-surface-20c side is hard to drop downward from the front-surface-20b side at the time when the first adhesive 30 is injected into the gap G1, as described above.

Besides, in the assembled battery 1 of the present embodiment, that inner peripheral surface 20h of the holder 20 which constitutes the holding hole 20d has a tapered surface having an inside diameter that is increased from the front-surface-20b side toward the back-surface-20c side (see FIG. 5). On this account, when the first adhesive 30 is injected into the gap G1 (see FIG. 10) as described above, the first adhesive 30 thus injected from the back-surface-20c side easily flows toward the front-surface-20b side along the inner peripheral surface 20h, which makes it possible to easily fill the first adhesive 30 into the gap G1. Hereby, the first adhesive 30 can be sufficiently filled into the gap G1. Accordingly, the assembled battery 1 of the embodiment is an assembled battery 1 in which the first adhesive 30 is sufficiently filled into the gap G1, and is an assembled battery in which the exterior tube 40 of the exterior tube equipped battery 70 is firmly fixed to the holder 20.

Further, as illustrated in FIG. 2, the assembled battery 1 of the present embodiment includes a second adhesive 32 injected and solidified in a gap G2 between the second peripheral edge covering portion 43 of the exterior tube 40 and the second-surface peripheral edge portion 18b of the battery 10. Note that the second adhesive 32 is provided over a whole circumference of the toric gap G2. Hereby, the battery 10 is joined to the exterior tube 40 by the second adhesive 32, and the battery 10 is firmly fixed to the exterior tube 40.

Besides, in the assembled battery 1 of the present embodiment, the second peripheral edge covering portion 43 has an open end portion on the other end side (a lower end side in FIGS. 2 and 7) of the exterior tube 40 as its own open end portion 43b. Further, as illustrated in FIG. 8, the open end portion 43b of the second peripheral edge covering portion 43 has such a configuration that the open end portion 43b is distanced from the second-surface peripheral edge portion 18b of the battery 10 in the axis direction AH (downward in FIG. 8) as it goes inward in the radial direction (the axis AX side of the battery 10, or the left side in FIG. 8).

Hereby, it is possible to achieve a large axis-direction distance H between the second-surface peripheral edge portion 18b of the battery 10 and a tip (an open end 43c) of the open end portion 43b of the second peripheral edge covering portion 43, thereby making it possible to easily inject the second adhesive 32 into the gap G2 between the second-surface peripheral edge portion 18b of the battery 10 and the second peripheral edge covering portion 43 of the exterior tube 40 (the second adhesive 32 easily flows into the gap G2). Hereby, it is possible to appropriately inject the second adhesive 32 into the toric gap G2 over the whole circumference thereof, and to firmly fix the battery 10 to the exterior tube 40.

In view of this, for example, as illustrated in FIG. 14, even in a case where the bus bar 3 is welded by resistance welding to the positive terminal 12 provided on the first surface 17 of the battery 10, the bus bar 3 can be appropriately welded by resistance welding to the positive terminal 12. More specifically, even when a large load is applied to the bus bar 3 in the axis direction AH (downward in FIG. 14) of the battery 10 by a first welding electrode 81 of a resistance welder 80 in a state where the bus bar 3 is placed on the positive terminal 12, it is possible to prevent only the battery 10 in the exterior tube equipped battery 70 from moving toward the axis direction AH (a load direction, a lower side in FIG. 14) (it is possible to prevent the battery 10 from being displaced relative to the exterior tube 40 in the axis direction AH). Note that, at the time of performing resistance welding, a second welding electrode 82 is placed so as to make contact with the first surface 17 of the battery 10.

Figure 6:
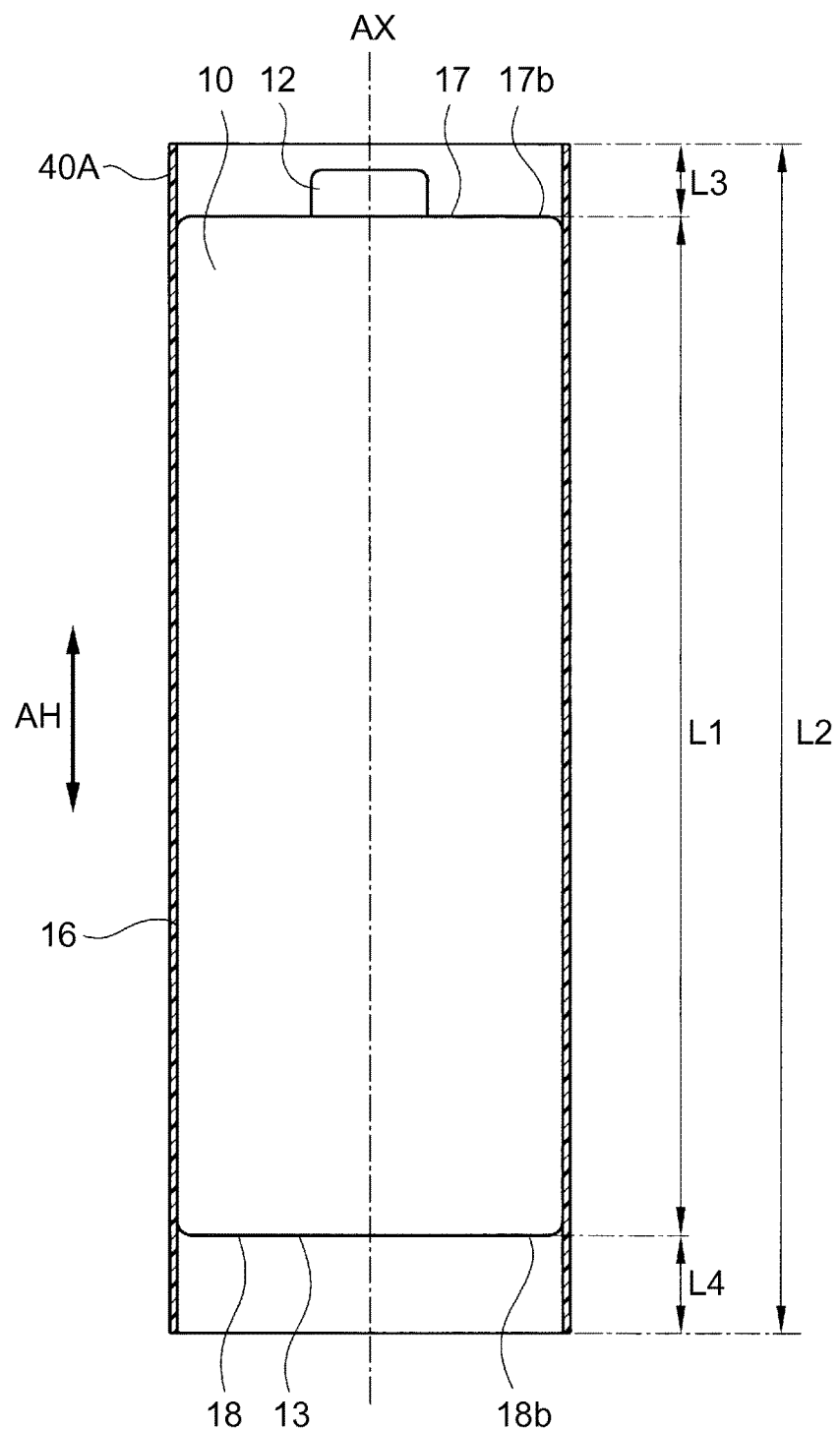
FIG. 6 is a view to describe a manufacturing method of an exterior tube equipped battery.

Next will be described a manufacturing method of the exterior tube equipped battery 70. First, an exterior tube (referred to as an unshrunk tube 40A) that has not thermally shrunk yet is prepared. As illustrated in FIG. 6, the unshrunk tube 40A has an axis-direction length L2 longer than an axis-direction distance L1 between the first surface 17 and the second surface 18 of the battery 10, and has an inside diameter that is slightly larger than an outside diameter of the battery 10. The unshrunk tube 40A is placed so as to cover the outer peripheral surface 16 of the battery 10 (the battery 10 is inserted into the unshrunk tube 40A). Note that the unshrunk tube 40A is placed so as to project from the first surface 17 of the battery and also project from the second surface 18. More specifically, the unshrunk tube 40A is placed so that a projecting length L4 of the unshrunk tube 40A from the second surface 18 of the battery 10 becomes longer than a projecting length L3 of the unshrunk tube 40A from the first surface 17 of the battery 10.

In this state, the unshrunk tube 40A is heated so as to be shrunk. Hereby, as illustrated in FIG. 7, the unshrunk tube 40A turns into an exterior tube 40 including a cylindrical outer-peripheral-surface adhesion portion 41 tightly adhered to the outer peripheral surface 16 of the battery 10, a toric first peripheral edge covering portion 42 covering the first-surface peripheral edge portion 17b, which is an outer periphery of the first surface 17 of the battery 10, and a toric second peripheral edge covering portion 43 covering the second-surface peripheral edge portion 18b, which is an outer periphery of the second surface 18 of the battery 10. Hereby, the exterior tube equipped battery 70 is completed.

Note that the projecting length L4 of the exterior tube 40A from the second surface 18 of the battery 10 is adjusted so that, when the unshrunk tube 40A is heated so as to be shrunk, the open end portion 43b of the second peripheral edge covering portion 43 is configured to be distanced from the second-surface peripheral edge portion 18b of the battery 10 in the axis direction AH as it goes inward in the radial direction (the axis-AX side of the battery 10, or the left side in FIG. 8) as illustrated in FIG. 8. In a case where a heating amount to shrink the exterior tube 40A is assumed constant, a shape of the open end portion 43b of the second peripheral edge covering portion 43 can be adjusted by adjusting the projecting length L4 of the exterior tube 40A from the second surface 18 of the battery 10. More specifically, when the projecting length L4 of the exterior tube 40A from the second surface 18 of the battery 10 is set to a predetermined length, the open end portion 43b of the second peripheral edge covering portion 43 can be configured to be distanced from the second-surface peripheral edge portion 18b of the battery 10 in the axis direction AH as it goes inward in the radial direction.

Figure 9:
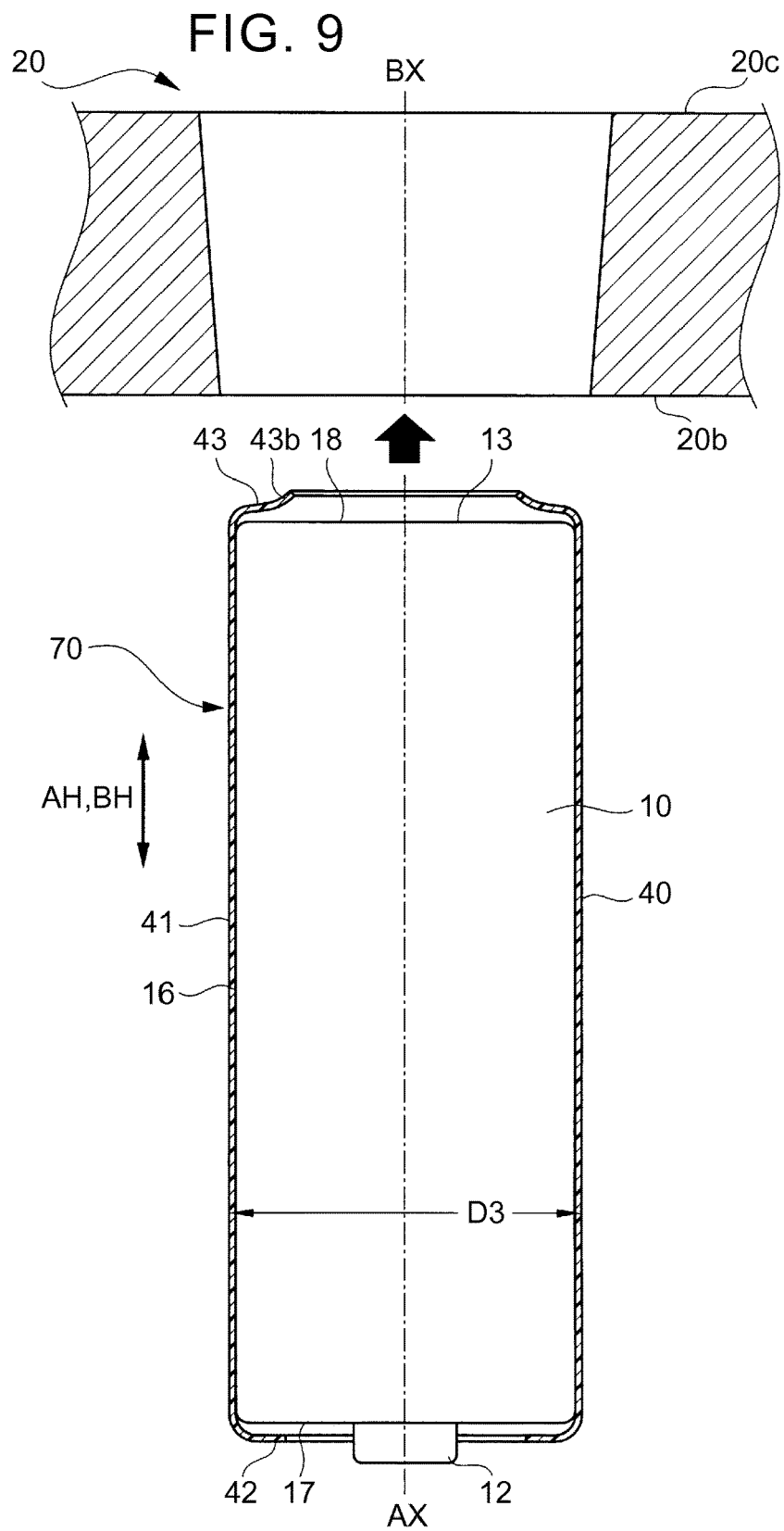
FIG. 9 is a view to describe a manufacturing method of an assembled battery according to an embodiment.

Next will be described a manufacturing method of an assembled battery according to the present embodiment. First, a predetermined number of exterior tube equipped batteries 70 manufactured in the aforementioned manner and a holder 20 are prepared. Then, in a battery insertion step, the exterior tube equipped battery 70 is inserted in a holding hole 20d of the holder 20, as illustrated in FIG. 9. More specifically, in a state where a back surface 20c of the holder 20 is directed upward (a front surface 20b is directed downward), the exterior tube equipped battery 70 is inserted into the holding hole 20d from a front-surface-20b side of the holder 20. Note that the exterior tube equipped battery 70 is inserted into the holding hole 20d from a second-surface-18 side, and in a state where a position of a second surface 18 of a battery 10 accords with the back surface 20c of the holder 20 in an axis direction BH of the holding hole 20d (in a direction along an axis BX of the holding hole 20d), the exterior tube equipped battery 70 is temporarily held by a jig (not shown) (see FIG. 10).

Figure 10:
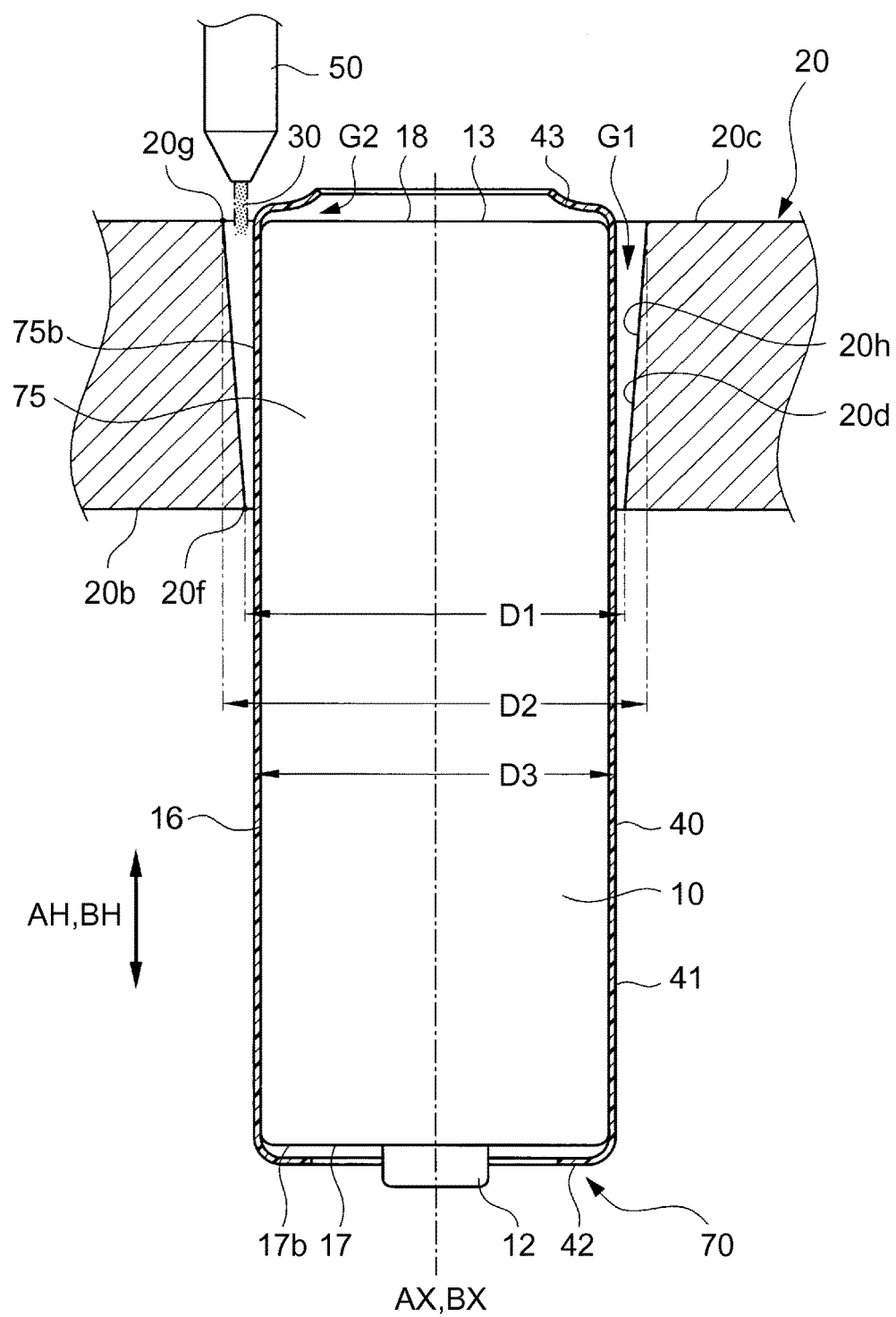
FIG. 10 is another view to describe the manufacturing method of the assembled battery according to the embodiment.

Subsequently, the process proceeds to a first-adhesive injection step, in which a first adhesive 30 is injected into a gap G1 between an outer peripheral surface 75b of that part (referred to as a held portion 75) of the exterior tube equipped battery 70 which is placed inside the holding hole 20d and that inner peripheral surface 20h of the holder 20 which constitutes the holding hole 20d. More specifically, as illustrated in FIG. 10, in a state where the back surface 20c of the holder 20 is directed upward (the front surface 20b is directed downward), the first adhesive 30 is injected into the gap G1 from a back-surface-20c side of the holder 20. Note that, in the present embodiment, a nozzle 50 connected to a dispenser (not shown) is placed above the holder 20 (the gap G1), and the first adhesive 30 discharged downward from the nozzle 50 is injected into the gap G1.

In the meantime, in the present embodiment, the holder 20 configured such that "an inside diameter D1 of a circular front-surface-side open end 20f, which is an open end of the holding hole 20d on the front-surface-20b side, is made smaller than an inside diameter D2 of a circular back-surface open end 20g, which is an open end of the holding hole 20d on a back-surface-20c side" is used (see FIG. 10). As such, since the inside diameter D2 (a diameter) of the back-surface-side open end 20g is made larger than the inside diameter D1 (a diameter) of the front-surface-side open end 20f, the first adhesive 30 easily comes inside the gap G1 at the time when the first adhesive 30 is injected into the gap G1 from the back-surface-20c side (see FIG. 10) in a state where the back surface 20c of holder 20 is directed upward (the front surface 20b is directed downward). Further, since the inside diameter D1 of the front-surface-side open end 20f is smaller than the inside diameter D2 of the back-surface-side open end 20g, the first adhesive 30 thus injected from the back-surface-20c side is hard to drop downward from the front-surface-20b side at the time when the first adhesive 30 is injected into the gap G1, as described above.

Besides, in the holder 20 used in the present embodiment, the inner peripheral surface 20h that constitutes the holding hole 20d has a tapered surface having an inside diameter that is increased from the front-surface-20b side toward the back-surface-20c side (see FIG. 10). On this account, when the first adhesive 30 is injected into the gap G1 as described above, the first adhesive 30 thus injected from the back-surface-20c side easily flows toward the front-surface-20b side along the inner peripheral surface 20h, which makes it possible to easily fill the first adhesive 30 into the gap G1. Hereby, the first adhesive 30 can be sufficiently filled into the gap G1.

Figure 11:
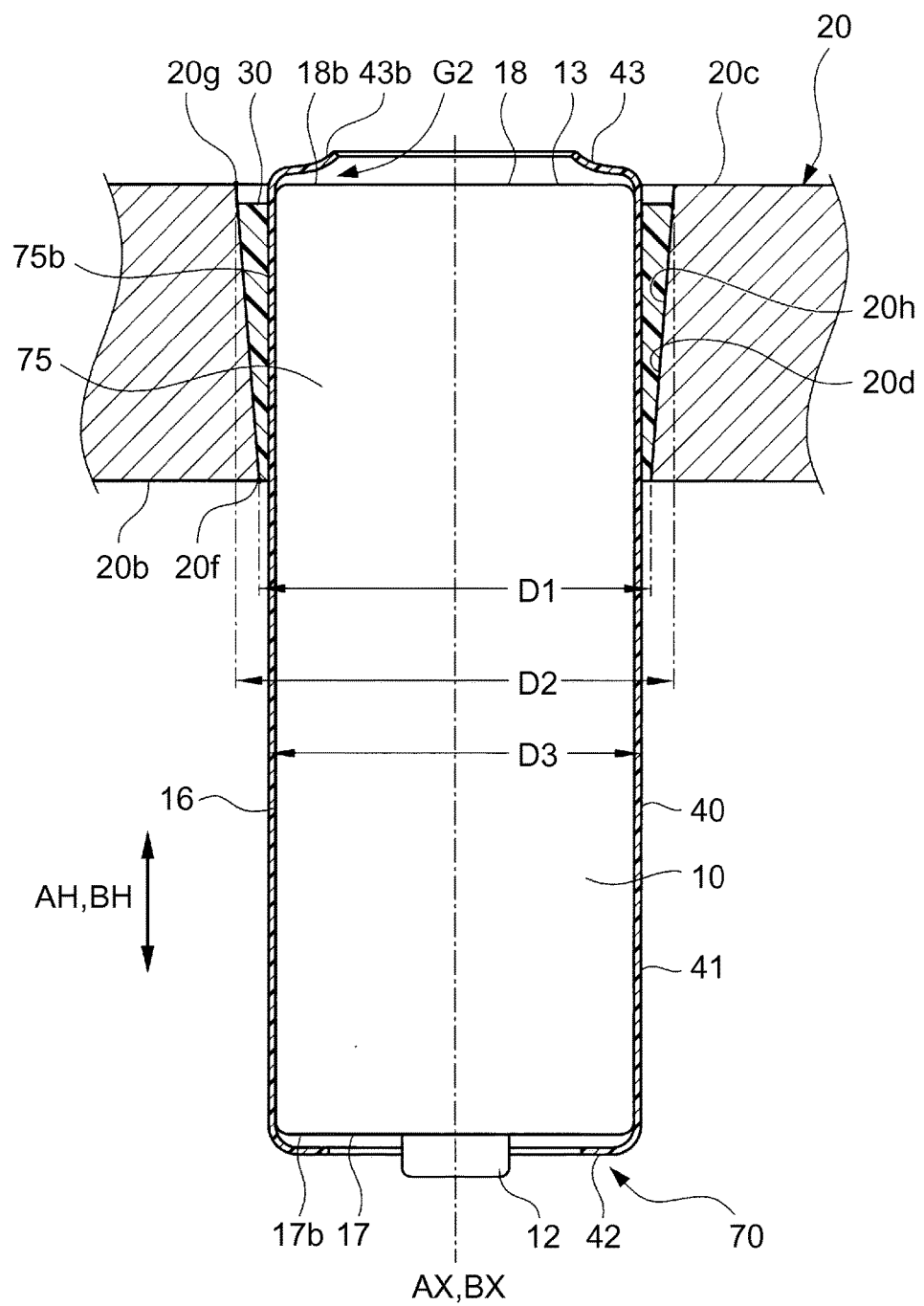
FIG. 11 is another view to describe the manufacturing method of the assembled battery according to the embodiment.

After that, as illustrated in FIG. 11, the first adhesive 30 thus injected solidifies (the first adhesive 30 is solidified), so that the exterior tube 40 of each of the exterior tube equipped batteries 70 is firmly fixed to the holder 20 in a state where the exterior tube 40 is joined, via the first adhesive 30, to the inner peripheral surface 20h that constitutes the holding hole 20d.

Figure 12:
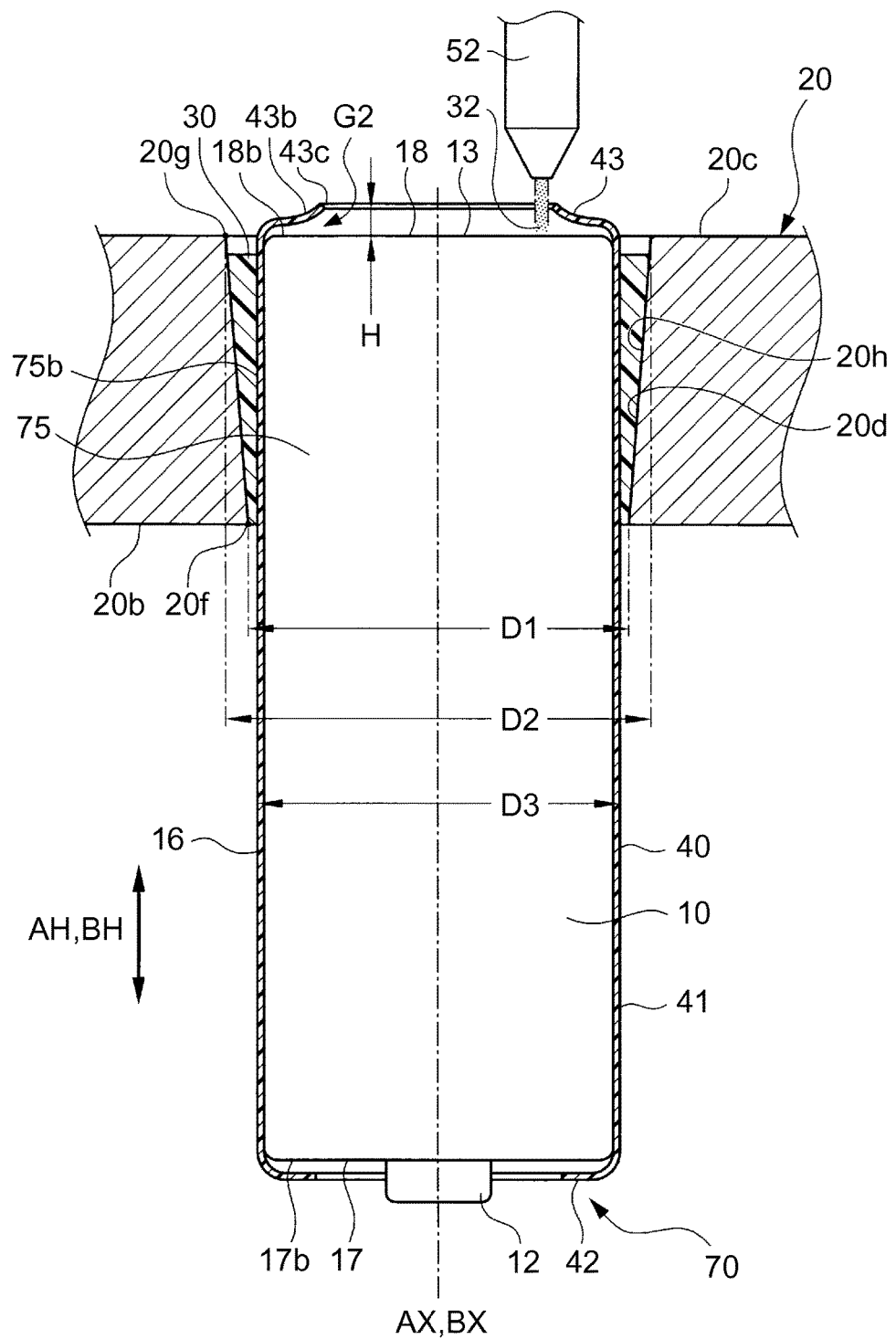
FIG. 12 is another view to describe the manufacturing method of the assembled battery according to the embodiment.

Subsequently, the process proceeds to a second-adhesive injection step, in which, as illustrated in FIG. 12, a second adhesive 32 is injected into a gap G2 between a second peripheral edge covering portion 43 of the exterior tube 40 and a second-surface peripheral edge portion 18b of the battery 10. More specifically, in a state where the back surface 20c of the holder 20 is directed upward (the front surface 20b is directed downward) and the second surface 18 of the battery 10 is direction upward, the second adhesive 32 is injected into the gap G2 from the back-surface-20c side of the holder 20 (from above the second surface 18 of the battery 10).

More specifically, in the present embodiment, a nozzle 52 connected to a dispenser (not shown) is placed above the second surface 18 of the battery 10 (at an inner side of the second peripheral edge covering portion 43 in the radial direction), and the second adhesive 32 is dropped from the nozzle 52 to that position in the second surface 18 of the battery 10 which is adjacent to a radially inner side of the second-surface peripheral edge portion 18b (a position adjacent to a radially inner side of the gap G2). Since a dimension (an opening dimension) of the gap G2 in the axis direction is small, the second adhesive 32 thus dropped enters (infiltrates) into the gap G2 due to capillarity. Moreover, the second adhesive 32 thus entering (infiltrating) into the gap G2 moves inside the gap G2 along its circumferential direction due to capillarity. Hereby, it is possible to inject the second adhesive 32 into the toric gap G2 over a whole circumference without moving the nozzle 52 in the circumferential direction.

Meanwhile, in the present embodiment, the open end portion 43b of the second peripheral edge covering portion 43 is configured to be distanced from the second-surface peripheral edge portion 18b of the battery 10 in the axis direction AH as it goes inward in the radial direction (the axis-AX side of the battery 10, or the left side in FIG. 8) as illustrated in FIG. 8. Hereby, it is possible to achieve a large axis-direction distance H between the second-surface peripheral edge portion 18b of the battery 10 and a tip (the open end 43c) of the open end portion 43b of the second peripheral edge covering portion 43, thereby making it possible to cause the second adhesive 32 to easily come inside the gap G2. Hereby, it is possible to inject the second adhesive 32 into the toric gap G2 over the whole circumference, appropriately, and to firmly fix the battery 10 to the exterior tube 40.

Note that, in the present embodiment, an adhesive having a viscosity lower than that of the first adhesive 30 is used as the second adhesive 32. By using the second adhesive 32 having a low viscosity, the second adhesive 32 easily comes inside the gap G2, and further easily moves inside the gap G2 along its circumferential direction. Hereby, it is possible to easily inject the second adhesive 32 into the toric gap G2 over the whole circumference.

Figure 13:
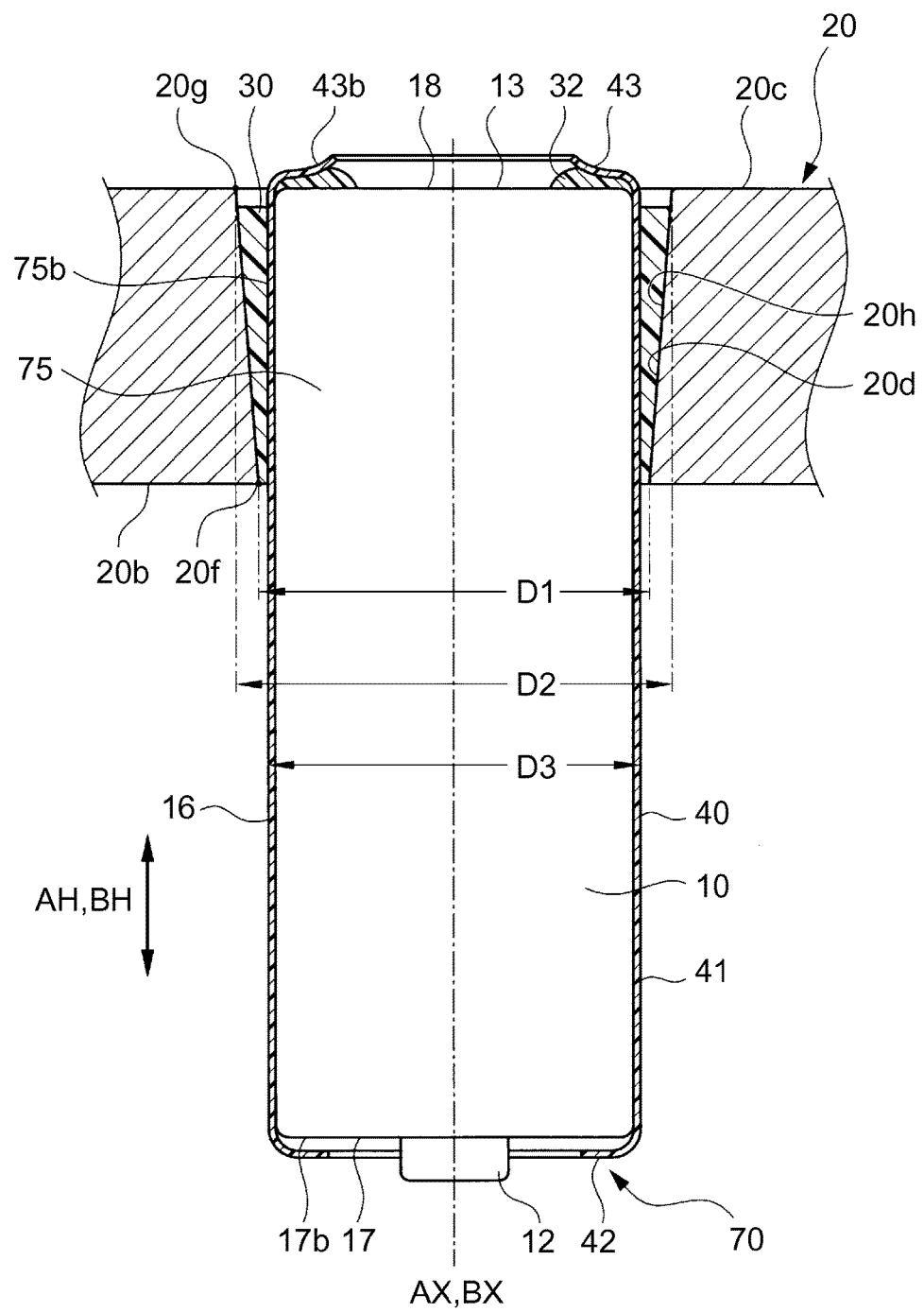
FIG. 13 is another view to describe the manufacturing method of the assembled battery according to the embodiment.

After that, as illustrated in FIG. 13, the second adhesive 32 thus injected solidifies (the second adhesives 32 is solidified), so that the battery 10 is joined to the exterior tube 40 by the second adhesive 32, and the battery 10 is firmly fixed to the exterior tube 40.

On this account, even in a case where a bus bar 3 is subsequently welded by resistance welding to a positive terminal 12 or a negative terminal 13 of the battery 10, the bus bar 3 can be welded by resistance welding thereto, appropriately. More specifically, as illustrated in FIG. 14, even when a large load is applied to the bus bar 3 in the axis direction AH (downward in FIG. 14) of the battery 10 by the first welding electrode 81 of the resistance welder 80 in a state where the bus bar 3 is placed on the positive terminal 12, it is possible to prevent only the battery 10 in the exterior tube equipped battery 70 from moving toward the axis direction AH (a load direction, a lower side in FIG. 14) (it is possible to prevent the battery 10 from being displaced relative to the exterior tube 40 in the axis direction AH). Note that, at the time of performing resistance welding, the second welding electrode 82 is placed so as to make contact with the first surface 17 of the battery 10.

The present invention has been described above in line with the embodiment, but the present invention is not limited to the above embodiment and can be modified and applied appropriately without departing from the gist of the present invention.

What is claimed is:
1. An assembled battery comprising:
a holder including a front surface, a back surface, and a holding hole, the holding hole being a cylindrical hole penetrating through between the front surface and the back surface; and
an exterior tube equipped battery including:
a cylindrical battery extending in an axis direction, the cylindrical battery including:
a first surface placed on one end side in the axis direction,
a second surface placed on the other end side in the axis direction, and
an outer peripheral surface placed between the first surface and the second surface, and a cylindrical exterior tube including an electrical insulation property and covering the outer peripheral surface of the battery, wherein:

the exterior tube equipped battery has an outside diameter smaller than an inside diameter of the holding hole;

the holder accommodates the exterior tube equipped battery into the holding hole;

the exterior tube includes:
- a cylindrical outer-peripheral-surface adhesion portion tightly adhered to the outer peripheral surface of the battery, and
- a toric peripheral edge covering portion that covers a surface peripheral edge portion, which is an outer peripheral edge portion of at least either one of the first surface and the second surface of the battery, wherein:

the toric peripheral edge covering portion has an open end portion of the exterior tube as an open end portion of the peripheral edge covering portion; and the open end portion of the peripheral edge covering portion is configured to be increasingly distanced away from the surface peripheral edge portion of the battery in the axis direction as it goes inward in a radial direction so as to form a gap between the surface peripheral edge portion of the battery and the peripheral edge covering portion;

the assembled battery includes:
a first adhesive injected and solidified in a gap between an outer peripheral surface of that part of the exterior tube equipped battery which is placed inside the holding hole and that inner peripheral surface of the holder which constitutes a hole wall of the holding hole, and a second adhesive injected and solidified in the gap between the surface peripheral edge portion of the battery and the peripheral edge covering portion.

2. An exterior tube equipped battery comprising:

a cylindrical battery extending in an axis direction, the cylindrical battery including:
- a first surface placed on one end side in the axis direction,
- a second surface placed on the other end side in the axis direction, and
- an outer peripheral surface placed between the first surface and the second surface; and a cylindrical exterior tube including an electrical insulation property and covering the outer peripheral surface of the battery, wherein:

the exterior tube includes:
- a cylindrical outer-peripheral-surface adhesion portion tightly adhered to the outer peripheral surface of the battery, and
- a toric peripheral edge covering portion that covers a surface peripheral edge portion, which is an outer peripheral edge portion of at least either one of the first surface and the second surface of the battery, wherein the toric peripheral edge covering portion has an open end portion of the exterior tube as an open end portion of the peripheral edge covering portion; and wherein the open end portion of the peripheral edge covering portion is configured to be increasingly distanced away from the surface peripheral edge portion of the battery in the axis direction as it goes inward in a radial direction, so that the peripheral edge covering portion has a gap between the surface peripheral edge portion and the peripheral edge covering portion.

3. A manufacturing method of an assembled battery welded to a bus bar, comprising:

accommodating an exterior tube equipped battery into a holding hole of a holder, the exterior tube equipped battery including:
a cylindrical battery extending in an axis direction and including a first surface placed on one end side in the axis direction, a second surface placed on the other end side in the axis direction, and an outer peripheral surface placed between the first surface and the second surface, and a cylindrical exterior tube including an electrical insulation property and covering the outer peripheral surface of the battery, the exterior tube including a cylindrical outer-peripheral-surface adhesion portion tightly adhered to the outer peripheral surface of the battery, and a toric peripheral edge covering portion that covers a surface peripheral edge portion, which is an outer peripheral edge portion of at least either one of the first surface and the second surface of the battery, and the holder including a front surface, a back surface, and the holding hole, the holding hole being a cylindrical hole penetrating through between the front surface and the back surface and which has an inside diameter larger than an outside diameter of the exterior tube equipped battery, wherein the method comprises:

heat shrinking the cylindrical exterior tube to the battery;

after heat shrinking, injecting and solidifying a first adhesive in a gap between an outer peripheral surface of that part of the exterior tube equipped battery which is placed inside the holding hole and that inner peripheral surface of the holder which constitutes a hole wall of the holding hole;

after injecting the first adhesive, injecting and solidifying a second adhesive in a gap between the surface peripheral edge portion of the battery and the peripheral edge covering portion; and applying a load to a bus bar in the axis direction by a welding electrode of a resistance welder in a state where the bus bar is placed on an electrode terminal provided on the first surface or the second surface.

4. The manufacturing method according to claim 3, wherein the toric peripheral edge covering portion has an open end portion of the exterior tube as an open end portion of the peripheral edge covering portion; and the open end portion of the toric peripheral edge covering portion is configured to be increasingly distanced away from the surface peripheral edge portion of the battery in the axis direction as it goes inward in a radial direction so as to form the gap between the surface peripheral edge portion of the battery and the peripheral edge covering portion.

* * * * *